US012776224B2

(12) United States Patent
Jorgensen et al.

(10) Patent No.: US 12,776,224 B2
(45) Date of Patent: Oct. 27, 2026

(54) SYSTEM, METHOD, AND APPARATUS FOR REMOTE, CUSTOMIZED SPEECH EDUCATION

(71) Applicant: AT HOME ARTICULATION, INC., Centerville, UT (US)

(72) Inventors: Andrea Elaine Jorgensen, Centerville, UT (US); Laura Jayne Walker, Centerville, UT (US)

(73) Assignee: AT HOME ARTICULATION, INC., Centerville, UT (US)

( * ) Notice: Subject to any disclaimer, the term of this patent is extended or adjusted under 35 U.S.C. 154(b) by 61 days.

(21) Appl. No.: 18/934,194

(22) Filed: Oct. 31, 2024

(65) Prior Publication Data

US 2025/0140127 A1 May 1, 2025

Related U.S. Application Data

(60) Provisional application No. 63/594,839, filed on Oct. 31, 2023.

(51) Int. Cl.

*G09B 19/04* (2006.01)
*G06V 40/20* (2022.01)

(52) U.S. Cl.

CPC ............. *G09B 19/04* (2013.01); *G06V 40/20* (2022.01)

(58) Field of Classification Search

CPC ......... G09B 19/04; G09B 5/065; G10L 15/02; G10L 15/22; G06V 40/20

See application file for complete search history.

(56) References Cited

U.S. PATENT DOCUMENTS

2001/0046658 A1* 11/2001 Wasowicz ............. G09B 5/065 434/167

* cited by examiner

*Primary Examiner* — Jerry-Daryl Fletcher
(74) *Attorney, Agent, or Firm* — KNH LLP

(57) ABSTRACT

Apparatuses, methods, systems, and program products are disclosed for remote, customized speech education. An apparatus is configured to receive a selection of a sound, a sound position, and a sound complexity. The apparatus is configured to determine a plurality of words based on the selected sound, sound position, and sound complexity and present a speech learning game using the plurality of words.

20 Claims, 11 Drawing Sheets

SYSTEM, METHOD, AND APPARATUS FOR REMOTE, CUSTOMIZED SPEECH EDUCATION

CROSS-REFERENCE TO RELATED APPLICATIONS

This application claims the benefit of U.S. Provisional Patent Application No. 63/594,839 entitled "SYSTEM, METHOD, AND APPARATUS FOR REMOTE, CUSTOMIZED SPEECH EDUCATION" and filed on Oct. 31, 2023, for Andrea Elaine Jorgensen, et al., which is incorporated herein by reference

FIELD

The subject matter disclosed herein relates to speech education and more particularly relates to systems, methods, and apparatuses for remote, customized speech education.

BACKGROUND

Speech education includes processes of teaching people to speak clearly and effectively. Speech language pathologists (SLPs) may offer speech education programs directed to improving grammar, pronunciation, fluency, and overall communication skills. In some cases, SLPs are assigned or contracted with school districts, private practices, charter schools, and private schools to offer speech education programs directed to improving speech sound disorders, language disorders, fluency disorders, pragmatic disorders, and overall communication skills.

BRIEF SUMMARY

An apparatus for remote, customized speech education is disclosed. In one embodiment, the apparatus is configured to receive a selection of a sound, a sound position, and a sound complexity. In one embodiment, the apparatus is configured to determine a plurality of words based on the selected sound, sound position, and sound complexity, display a first stage of a game, output a first work of the plurality of words, determine that the user has attempted the work a threshold number of times, and present a second state of the game for a second word of the plurality of words.

A method for remote, customized speech education is disclosed. In one embodiment, the method receives a selection of a sound, a sound position, and a sound complexity. In one embodiment, the method determines a plurality of words based on the selected sound, sound position, and sound complexity, displays a first stage of a game, outputs a first work of the plurality of words, determines that the user has attempted the work a threshold number of times, and presents a second state of the game for a second word of the plurality of words.

A computer program product for remote, customized speech education is disclosed. In one embodiment, the computer program product is configured to receive a selection of a sound, a sound position, and a sound complexity. In one embodiment, the computer program product is configured to determine a plurality of words based on the selected sound, sound position, and sound complexity. In one embodiment, the computer program product is configured to generate a display that includes one or more sentences comprising each word of the plurality of words and a plurality of images positioned on the display in an order corresponding to an order of the plurality of words, wherein each image of the plurality of images comprises at least one image corresponding to a word of the plurality of words for facilitating speech learning.

BRIEF DESCRIPTION OF THE DRAWINGS

A more particular description of the examples briefly described above will be rendered by reference to specific examples that are illustrated in the appended drawings. Understanding that these drawings depict only some examples and are not therefore to be considered to be limiting of scope, the examples will be described and explained with additional specificity and detail through the use of the accompanying drawings, in which.

DETAILED DESCRIPTION

Figure 1:
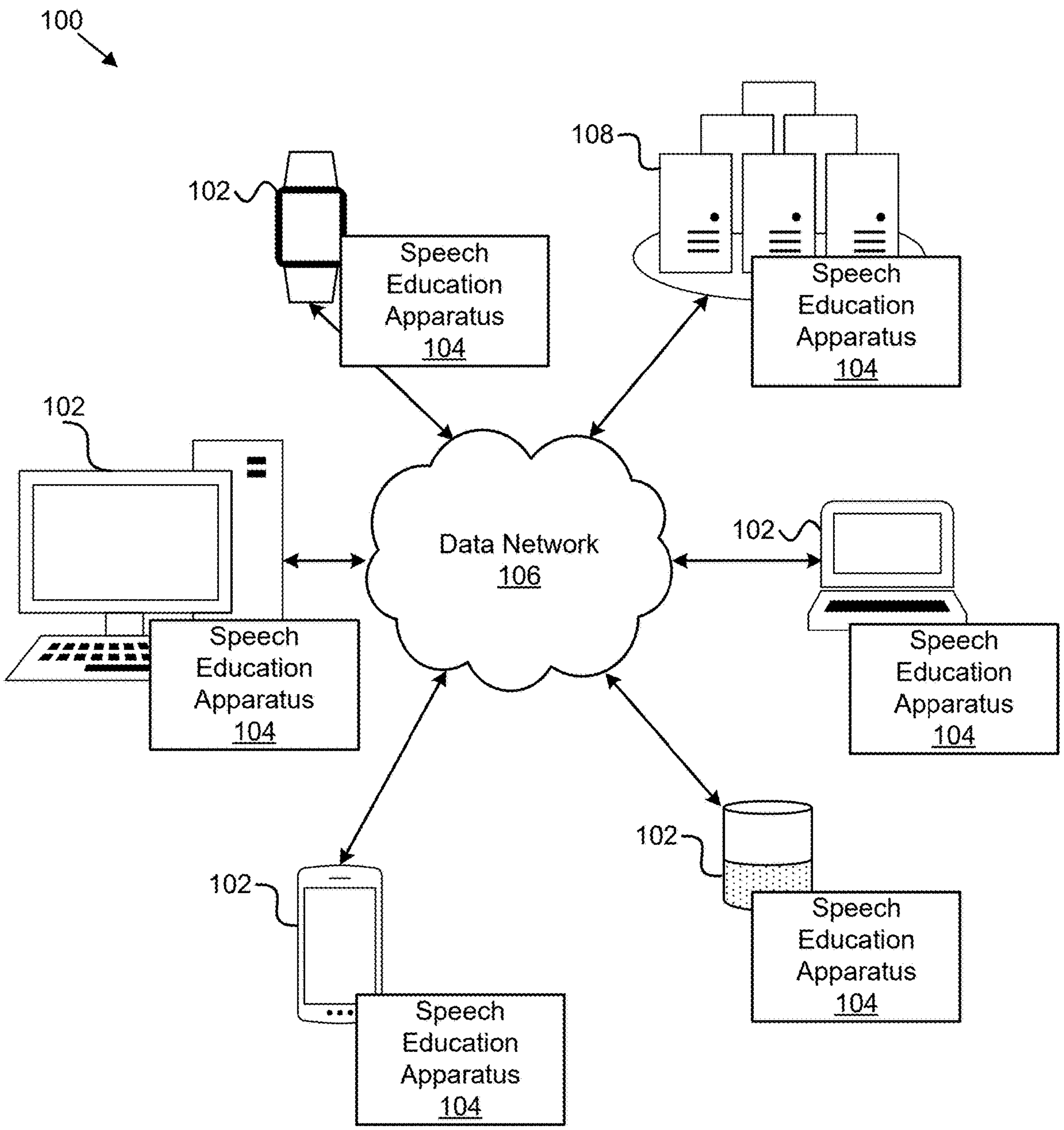
FIG. 1 is a schematic block diagram illustrating one example of a system 100 for speech education.

As will be appreciated by one skilled in the art, aspects of the examples may be embodied as a system, method or program product. Accordingly, examples may take the form of an entirely hardware example, an entirely software example (including firmware, resident software, micro-code, etc.) or an example combining software and hardware aspects that may all generally be referred to herein as a "circuit," "module" or "system." Furthermore, examples may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain example, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for examples may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one example," "an example," or similar language means that a particular feature, structure, or characteristic described in connection with the example is included in at least one example. Thus, appearances of the phrases "in one example," "in an example," and similar language throughout this specification may, but do not necessarily, all refer to the same example, but mean "one or more but not all examples" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the examples may be combined in any suitable manner. In the following description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described below with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various examples. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding examples. Indeed, some arrows or other connectors may be used to indicate only the logical flow of the depicted example. For instance, an arrow may indicate a waiting or monitoring period of unspecified duration between enumerated steps of the depicted example. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate examples of like elements.

An apparatus for remote, customized speech education is disclosed. In one embodiment, the apparatus is configured to receive a selection of a sound, a sound position, and a sound complexity. In one embodiment, the apparatus is configured to determine a plurality of words based on the selected sound, sound position, and sound complexity, display a first stage of a game, output a first work of the plurality of words, determine that the user has attempted the work a threshold number of times, and present a second state of the game for a second word of the plurality of words.

In one embodiment, the plurality of words comprise words having the sound in the sound position. In one embodiment, the apparatus is configured to, in response to input from the user, generate a number of phrases, each phrase comprising at least one word of the plurality of words.

In one embodiment, the apparatus is configured to, in response to input from the user, generate a number of sentences, each sentence comprising at least one word of the plurality of words. In one embodiment, the sound position comprises at least one of: a first syllable of a word, a middle syllable of a word, or an ending syllable of a word.

In one embodiment, the apparatus is configured to select the sound and the sound position based at least in part on input from the user, input from an additional user, or a combination thereof. In one embodiment, the apparatus is configured to record additional speech from the user, determine, based on additional recorded speech, that the user has made an additional quantity of attempts to speak the second word, determine that the additional quantity of attempts is equal to or greater than the predetermined quantity, in response to the determination, display a third stage of the game to the user, and output a third word of the plurality of words.

In one embodiment, the apparatus is configured to select a second sound of a plurality of sounds, select an additional sound position of the plurality of sound positions, and determine, based at least in part on the additional sound and the additional sound position, an additional plurality of words.

In one embodiment, the apparatus is configured to, in response to determining that the user has completed each stage of a plurality of stages of the game, transmit a notification to a second user, wherein the notification prompts the second user to transmit a message to a third user.

In one embodiment, the apparatus is configured to select at least one of the sound or the sound position based at least in part on input from the third user. In one embodiment, the apparatus comprises a mobile application on a mobile device, the mobile application having a graphical user interface ("GUI"), wherein the code is further executable by the processor to display the first stage of the game to the user and the second stage of the game to the user through the GUI.

In one embodiment, the apparatus is configured to output the first word and the second word via at least one of the GUI and a speaker of the mobile device. In one embodiment, the apparatus is configured to select, from a plurality of instructional videos, an instructional video corresponding to the selected sound and display, within the GUI, the instructional video prior to displaying the first stage of the game.

In one embodiment, the apparatus is configured to generate a report based at least in part on recorded speech, the selected sound, the selected sound position, the plurality of words, the quantity of attempts, at least one game which the user progresses through in one session and transmit the report to a second user. In one embodiment, the apparatus is configured to transmit a recording of the recorded speech to at least one of the second user and a third user.

A method for remote, customized speech education is disclosed. In one embodiment, the method receives a selection of a sound, a sound position, and a sound complexity. In one embodiment, the method determines a plurality of words based on the selected sound, sound position, and sound complexity, displays a first stage of a game, outputs a first work of the plurality of words, determines that the user has attempted the work a threshold number of times, and presents a second state of the game for a second word of the plurality of words.

A computer program product for remote, customized speech education is disclosed. In one embodiment, the computer program product is configured to receive a selection of a sound, a sound position, and a sound complexity. In one embodiment, the computer program product is configured to determine a plurality of words based on the selected sound, sound position, and sound complexity. In one embodiment, the computer program product is configured to generate a display that includes one or more sentences comprising each word of the plurality of words and a plurality of images positioned on the display in an order corresponding to an order of the plurality of words, wherein each image of the plurality of images comprises at least one image corresponding to a word of the plurality of words for facilitating speech learning.

In one embodiment, the computer program product is configured to identify a number of attempts within recorded speech, each attempt of the number of attempts comprising an attempt of a user to speak a word of the plurality of words, compare each attempt of the number of attempts to a reference audio sound for the word, determine, based at least in part on the comparing, whether each attempt of the number of attempts comprises a successful attempt or an unsuccessful attempt, and transmit a notification to an additional user, the notification comprising a percentage of successful attempts of the number of attempts.

In one embodiment, the computer program product is configured to perform determining whether a quantity of the number of successful attempts is less than a threshold quantity. In one embodiment, the computer program product is configured to capture a video of the user performing the recorded speech, determine, based on the selected sound and a movement pattern of the user's mouth and/or tongue, an instruction, and transmit the instruction to at least one of the user and an additional user. In one embodiment, the instruction comprises an instruction to change a movement pattern of the user's mouth and/or tongue to improve pronunciation of the selected sound.

FIG. 1 is a schematic block diagram illustrating one example of a system 100 for speech education. The system 100 includes a number of information handling devices 102 communicably connected to each other and/or to a remote server 108 via a data network 106. In some examples, a speech education apparatus 104 is embodied on at least one of an information handling device 102 and a server 108. For example, different users access the speech education apparatus 104 via different information handling devices 102. Users include, for example, SLP users, student users who will be practicing speech via the speech education apparatus 104, and/or parent/guardian/supervisory users who monitor student progress, communicate with SLP users, and/or receive reports of student progress.

The speech education apparatus 104, in such an example, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one example, the speech education apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the speech education apparatus 104.

The semiconductor integrated circuit device or other hardware appliance of the speech education apparatus 104, in certain examples, includes and/or is communicatively coupled to one or more volatile memory media, which may include but is not limited to random access memory ("RAM"), dynamic RAM ("DRAM"), cache, or the like. In one example, the semiconductor integrated circuit device or other hardware appliance of the speech education apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one example, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one example, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one example, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. For instance, a server 108 may be an intermediary between information handling devices 102 to facilitate sending and receiving electronic messages between the information handling devices 102.

Figure 2:
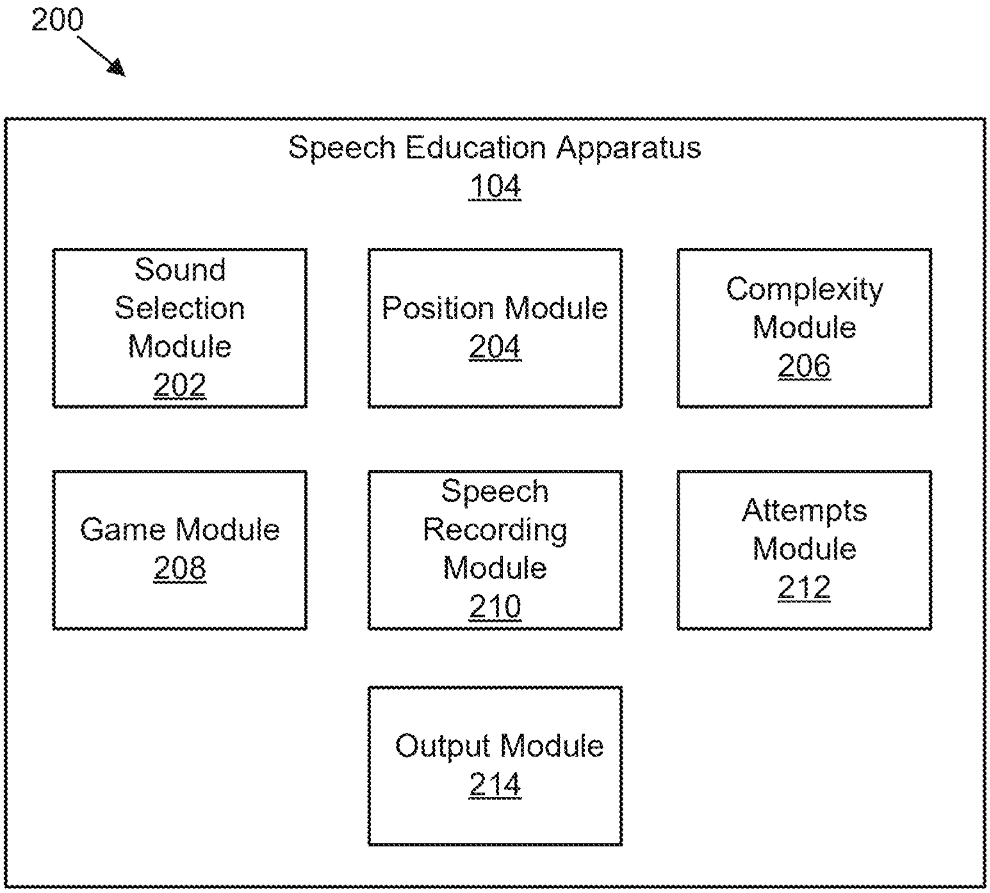
FIG. 2 is a schematic block diagram illustrating one example of an apparatus 200 for speech education.

FIG. 2 is a schematic block diagram illustrating one example of an apparatus 200 for digital speech education. In one example, the apparatus 200 includes an example of a speech education apparatus 104. The speech education apparatus 104, in some examples, includes one or more of a sound selection module 202, a position module 204, a word module 206, a game module 208, and an output module 214, which are described in more detail below.

In general, the speech education apparatus 104 is configured to provide means for facilitating speech education and practical learning by using computing technology to connect all involved stakeholders—clinicians, parents, and/or children/students. As described herein, the speech education apparatus 104 provides interactive flashcards, games, and/or other learning mechanisms for learning and reinforcing speech lessons, patterns, or the like.

In one embodiment, the speech education apparatus 104 allows a clinician to configure and design learning lessons, games, homework, quizzes, tests, assessments, and/or the like and assign them to a student. The speech education apparatus 104 allows a parent, or other interested party, to monitor and manage a student's learning. The speech education apparatus 104 tracks analytics, such as a frequency of use, the number of trials/tests/quizzes/assessments were performed, progress through a module or towards a goal, and/or the like. The speech education apparatus 104 can facilitate notifications, chat, messaging, and/or other communications between parents/students and the clinician. Real-time video/audio communications and feedback can be provided to the student.

Figure 6:
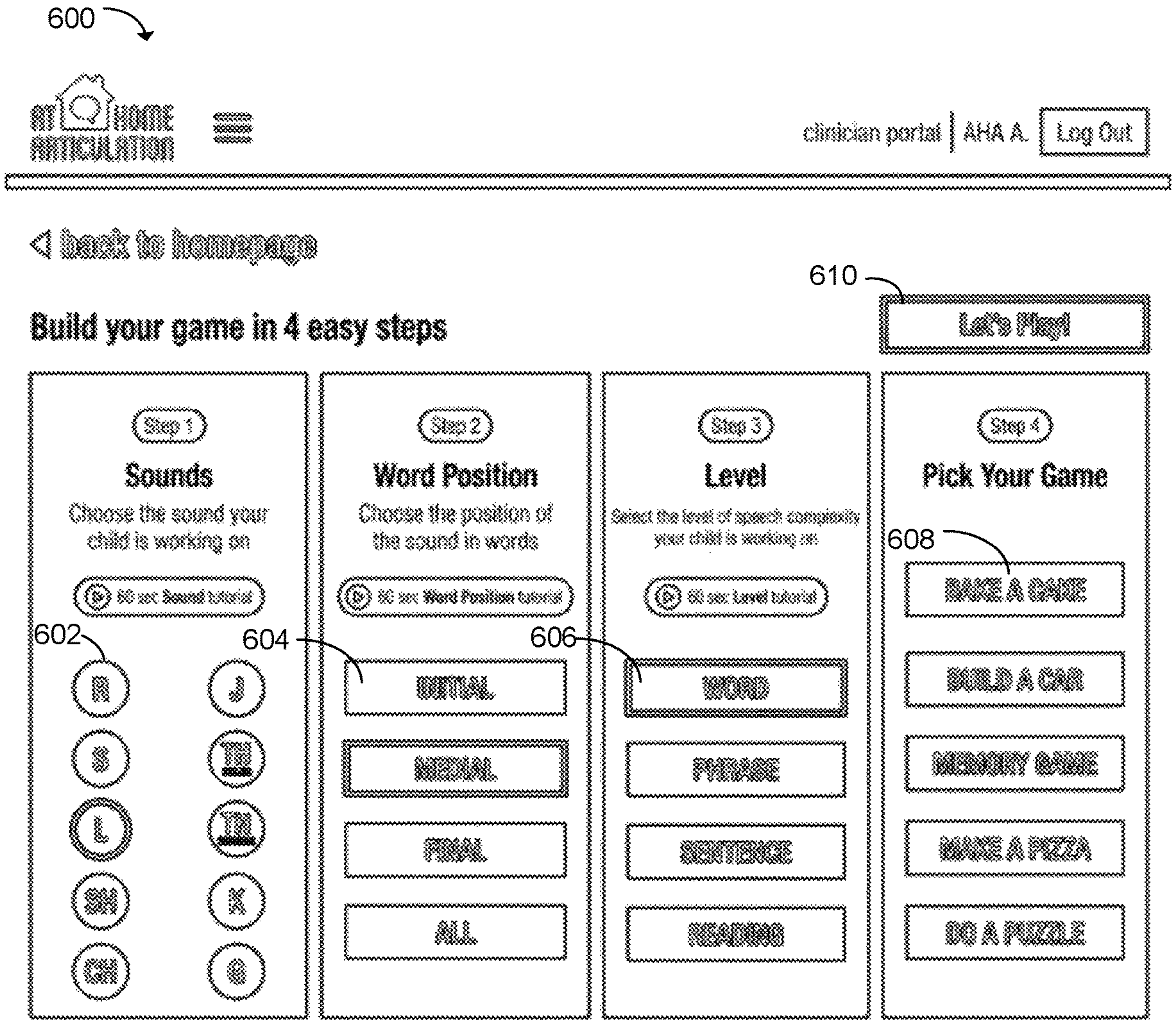
FIG. 6 illustrates an example of a user interface of an apparatus for speech education.

Accordingly, a clinician and/or a student may begin by selecting a speech sound to train or learn (e.g., as shown in the example interface in FIG. 6). The sound selection module 202, in one example, is configured to receive a selection of a speech sound of a plurality of speech sounds, e.g., in response to user input. The plurality of speech sounds, for example, include phonemes of the English language; however other languages may be supported by the subject matter disclosed herein.

The sound selection module 202, in one embodiment, selects or determines a speech sound for the student user to practice. In some examples, the sound selection module 202 determines the speech sound based at least in part on input from a student user, input from a parent user, input from an SLP user, reports on previous tests and/or games that the user completes, a determination of incorrectly pronounced sounds based at least in part on a recording of the student user, or any combination thereof. For example, the sound selection module 202 determines, based on input from an SLP user, that a student user is struggling to pronounce the speech sound 'th' and selects the speech sound 'th' for further analysis, testing, practice, education, and/or the like, as described below.

In another example, the sound selection module 202 analyzes a recording of the student user speaking, e.g., a baseline recording or sound signature, and determines, based on that recording, that the student user is incorrectly pronouncing and/or taking longer than usual to pronounce the speech sound 'th'. Based on the determination, the sound selection module 202 selects the speech sound 'th' for further analysis, testing, practice, education, and/or the like, as described below. In certain embodiments, the sound selection module 202 may generate suggestions or recommendations for speech sounds that the student user can improve. In such an embodiment, the sound selection module 202 may use artificial intelligence (AI) to determine the suggestions/recommendations.

In another example, the sound selection module 202 selects the speech sound based on a selection made by a user (e.g., student user, SLP user, parent user) through a graphical user interface (GUI). For example, as shown in FIG. 6, the sound selection module 202 may present a GUI 600 that has one or more sound buttons 602 that the user can select. The sound selection module 202 selects the user-selected sound for further analysis, testing, practice, education, and/or the like, as described below.

The sound position module 204, in some embodiments, is configured to select or determine a sound position of a plurality of sound positions. The sound position, for example, may include a position within a word (e.g., an initial, medial, or final position of a word). For example, a sound position may include a position of a selected sound within a word for the student user to practice. For instance, as shown in FIG. 6, the sound positions may include the following positions, which a user may select-initial, medial, and final. As used herein, initial sounds may refer to the first sound of the word, medial sounds may refer to a sound that precedes and/or follows a syllable in the word, and final sounds may refer to the last sound in a word.

In one example, the sound selection module 202 selects the sound 'th'. The position module 204 determines that the student user is proficient at pronouncing words that begin with "th," such as "think" and "thump." However, the sound position module 204 determines that the student user struggles to pronounce words with 'th' in the medial position, such as "bathe" and "frothy." For example, the SLP inputs speech test results that indicate the student user struggles with the "th" sound in the middle of words.

In another example, the parent and/or student user selects the sound 'th' and the middle position. For example, as shown in FIG. 6, the sound position module 204 may present a GUI 600 that includes a number of sound position buttons 604 for a user to select. The sound position module 204 selects or uses the sound position that the user selects via the GUI 600.

In one embodiment, the complexity module 206 may determine and/or select a sound complexity level. For example, the sound complexity level may include a placement of the speech sound at a word level, within a phrase, within a sentence, at a reading level, at a conversation level, and/or the like, e.g., a sound in isolation, a sound in syllables, a sound in conversation, and/or the like. In such an embodiment, the complexity module 206 may create or direct generation of words, phrases, sentences, reading passages, and/or conversations that can be used to assess the user's learning at different complexity levels. In certain embodiments, the sound complexity level may be determined using a Cycles approach, a complexity approach, or the like.

In some examples, in response to the "word" complexity level being selected or determined, the complexity module 206 is configured to generate one or more words where each word includes the sound that the sound selection module 202 determines in the position that the position selection module 204 determines. For example, the sound selection module 202 may determine that the selected sound is 'sh', and the position module 204 may determine that the position within the word is "initial." The complexity module 206 may then generate a list of words that include the selected sound 'sh' in the "initial" position such as "shame," "share," "shape," "sharp," "she," "shell," and/or "shove." In some examples, the complexity module 206 selects the words from a word bank or other database of words.

In some examples, the complexity module 206 is configured to determine a phrase complexity level, in response to input from the user (e.g., in response to selection of the "phrase" complexity level), and generate a number of phrases. As used herein, a phrase may refer to a group of words that together form a single unit in a sentence. In one embodiment, each phrase includes at least one word that the complexity module 206 generates and that includes the selected speech sound and position. In some examples, the complexity module 206 generates the number of phrases via AI. In other examples, the complexity module 206 selects phrases from a database of phrases. In one embodiment, the output module 214 is configured to output a phrase containing a word, rather than just outputting a single word.

In some examples, the complexity module 206 is configured to determine a sentence complexity level, in response to input from the user (e.g., in response to the user selecting the "sentence" complexity), and generate a number of sentences. Each sentence includes at least one word that the complexity module 206 generates, including the selected speech sound and position. In some examples, the complexity module 206 generates the number of sentences via AI. In other examples, the complexity module 206 selects sentences from a database of sentences. In one embodiment, the output module 214 is configured to output the generated sentences rather than individual words.

In one embodiment, the complexity module 206 is configured to determine a reading complexity level, in response to input from the user (e.g., in response to the user selecting the "reading" complexity), and generate one or more reading passages, e.g., paragraphs, pages, chapters, snippets, articles, or the like. In such an embodiment, each passage includes at least one word that the complexity module 206 generates, including the selected speech sound and position. In some examples, the complexity module 206 generates the reading passage(s) via AI. In other examples, the complexity module 206 selects reading passages from a database of reading passages. In one embodiment, the output module 214 is configured to output the generated reading passages rather than individual words.

In one embodiment, the complexity module 206 is configured to, in response to a "conversation" complexity level being selected, generate one or more conversational prompts, audio prompts, and/or the like for practicing and assessing a user's speech in a conversation setting. In such an embodiment, each conversational prompt includes at least one word that the complexity module 206 generates, including the selected speech sound and position, and/or is intended to elicit a response from the user that includes a word, phrase, or sentence that includes the speech sound being assessed. In some examples, the complexity module 206 generates the conversational prompts via AI, e.g., the complexity module 206 may utilize a chat bot to generate prompts and responses to the user's responses. In other examples, the complexity module 206 selects conversational prompts from a database of conversational prompts. In one embodiment, the output module 214 is configured to output the generated conversational prompts rather than individual words, e.g., as a chat dialogue or the like.

Figure 7A:
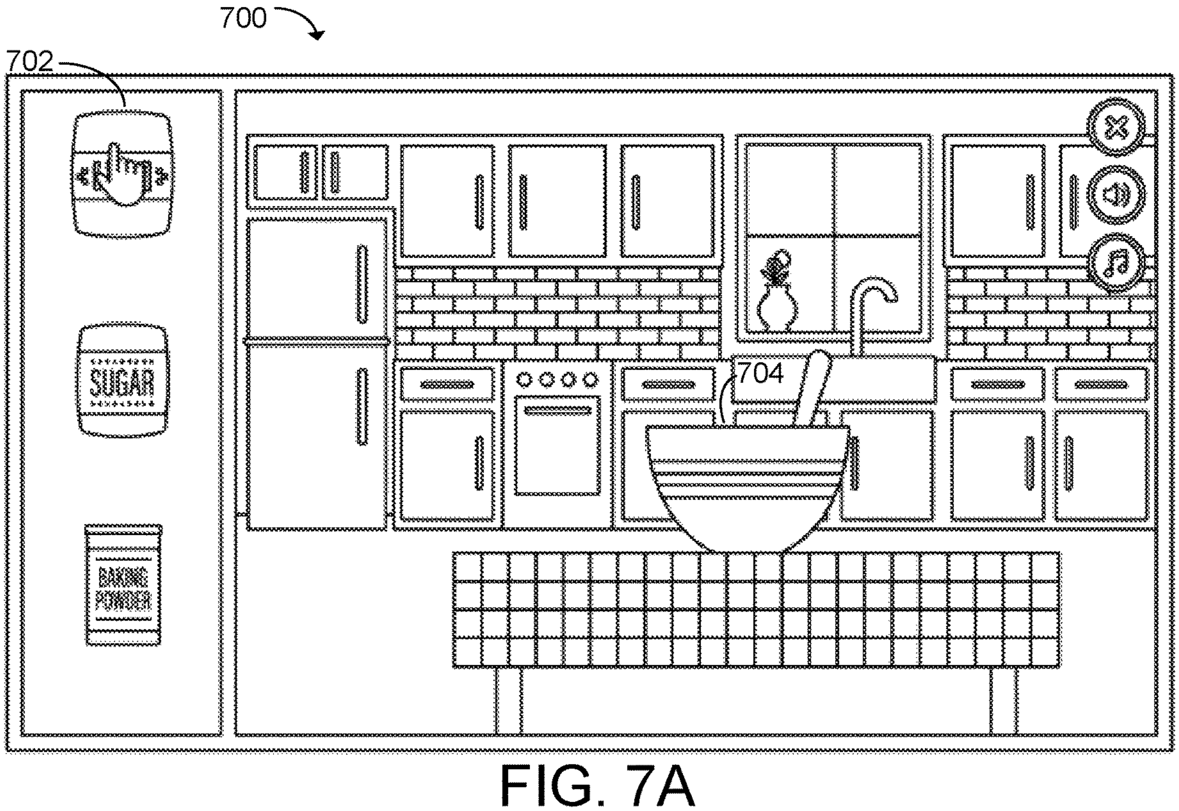
FIG. 7A illustrates a view of an example of a game displayed on a user interface.
Figure 7B:
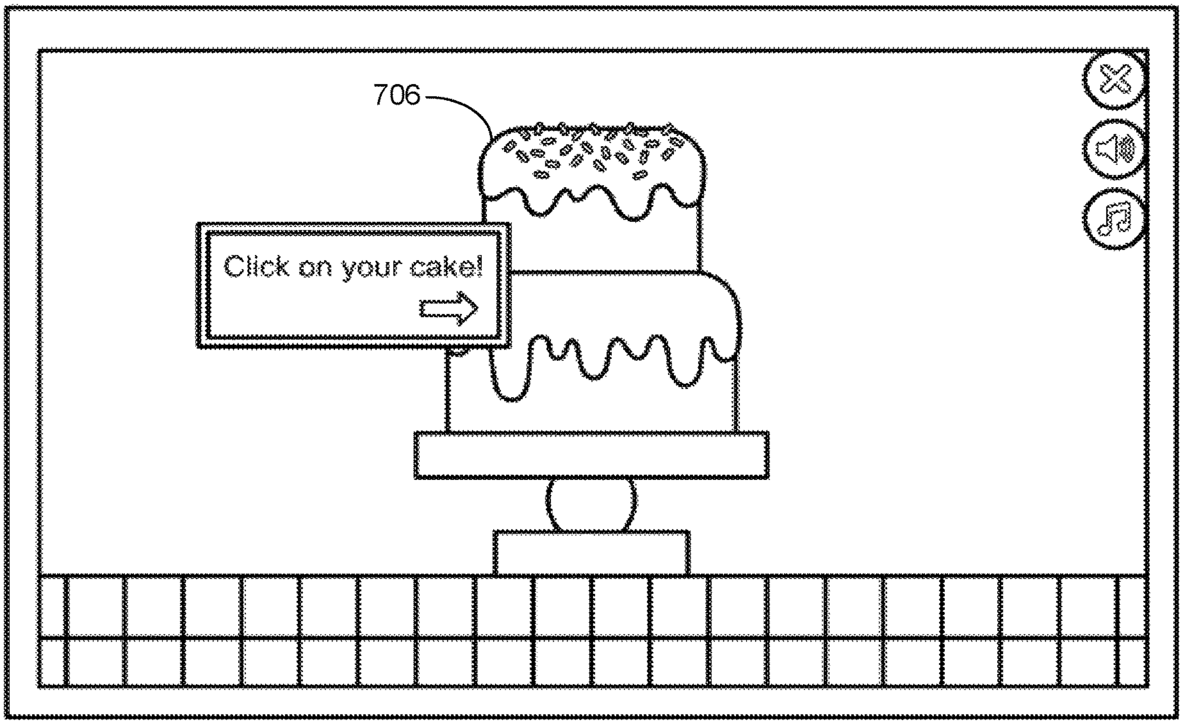
FIG. 7B illustrates a view of an example of a game displayed on a user interface.

In some embodiments, the game module 208 is configured to select or determine and display a game associated with speech learning. For example, as shown in FIG. 6, the game module 208 may present a GUI 600 that includes several buttons 608 for selecting different types of games for testing the generated words. The game module 208, in one embodiment, is configured to display the first phase of a game. For example, as shown in FIGS. 7A-B, the game module 208 shows a cooking game on a GUI 700. As shown in FIG. 7A, the first phase of the game includes adding ingredients 702 to a bowl 704.

In some examples, the speech recording module 210 records speech of the student user. In such examples, the speech recording module 210 records the student user attempting the practice words, phrases, sentences, or the like. For example, the speech recording module 210 records the speech via a microphone of the information handling device 102 that the student user is accessing the speech education apparatus 104 with.

In some examples, the attempts module 212 is configured to determine that the user has attempted to speak the word, phrase, sentence, or the like, presented to them based at least in part on the recorded speech. In other examples, the attempts module 212 is configured to determine that the user has attempted to speak the word, phrase, sentence, or the like, by analyzing a video recording showing movement of the user's face. In some examples, the attempts module 212 is configured to determine that the user has attempted the word, phrase, sentence, or the like, based on user input (e.g., user input via a GUI and/or via the information handling device 102).

Figure 8:
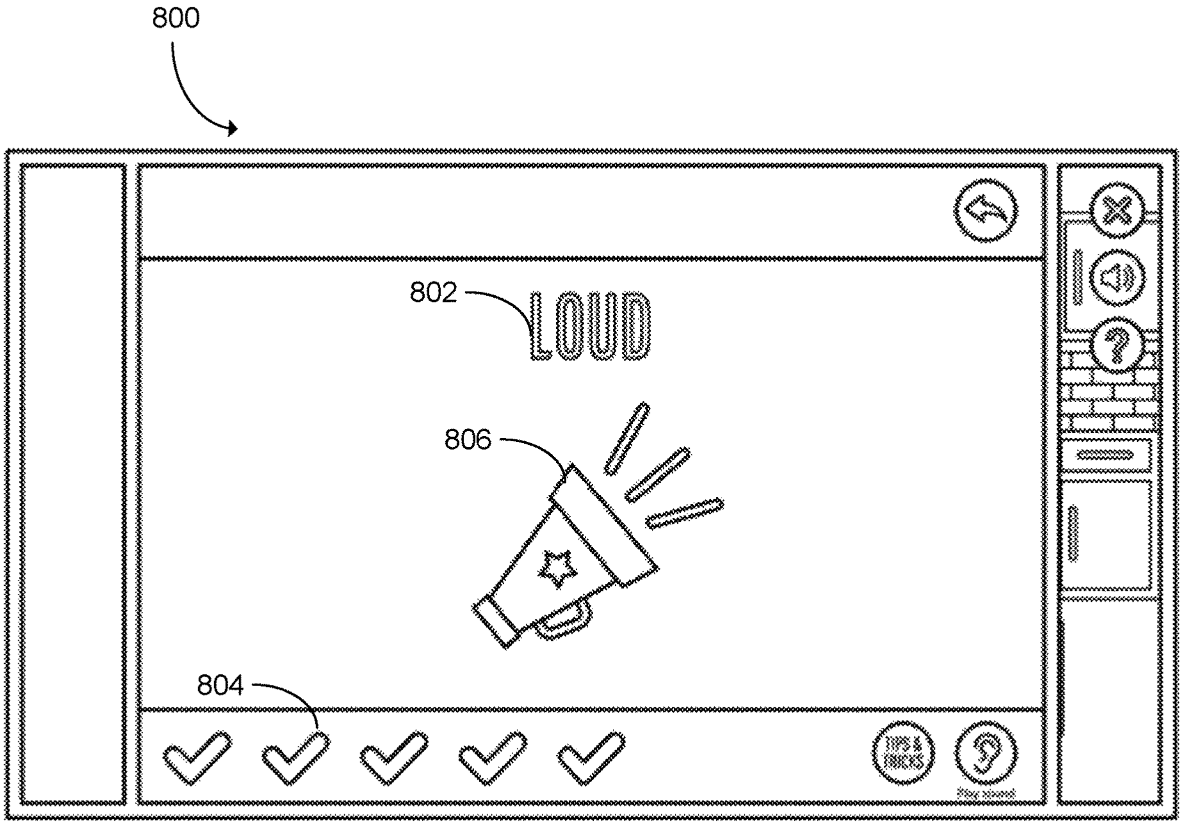
FIG. 8 illustrates a view of an example of a game displayed on a user interface.

In some examples, the attempts module 212 is configured to determine that a quantity of attempts is equal to or greater than a predetermined, assigned quantity. For example, the attempts module 212 is configured to assign the user five attempts per word. In another example, the SLP user assigns the student user five attempts per word and inputs that information into the application. For example, FIG. 8 shows an example of a user interface 800 displaying a practice word, "loud" 802. As shown by the five green checkmarks 804 at the bottom of the screen, the student user is prompted to attempt the word five times. Each time that the student user attempts the word, the attempts module changes the color of the checkmark (e.g., from white to green).

In some examples, the attempts module 212 is further configured to determine whether the attempts are successful. For example, the attempts module 212 compares the recorded speech to an example pronunciation of the word (e.g., a pre-recorded or baseline example) and, in response to determining that the recorded speech is within a certain deviation of the example pronunciation, considers the attempt to be successful and allows the student user to progress to either the next attempt in that stage/word or onto the next stage/word.

In some examples, the game module 208 is configured to, in response to the attempts module 212 determining that the quantity of attempts is greater than or equal to the predetermined, assigned quantity of attempts, display a second stage of the game to the student user. For example, the game module 208 progresses from the first stage of collecting ingredients 702, shown in FIG. 7A, to a second stage of mixing the ingredients, and viewing the completed cake 706, shown in FIG. 7B. Thereafter, the output module 214 outputs a second word of the plurality of words. The apparatus 200 is configured to repeat this process, moving through the selected game as the student user completes their attempts of the assigned words and/or phrases. For example, the final stage of the game shown in FIGS. 7A and 7B is eating the cake.

In some examples, the game can include multiple sets of words, sentences, phrases, or the like for multiple sounds. For example, the sound selection module 202 selects two or more sounds for the user to practice, the position selection module 204 selects one or more positions per sound, and the complexity module 206 generates a plurality of sets of words, each set corresponding to a different sound. In some examples, the practice session includes multiple games, and the words that the complexity module 206 generates (e.g., even words of different sets) are dispersed throughout the games. In other examples, only one set of words is used per game.

In some examples, the output module 214 is configured to output each word of the plurality of words. For example, as shown in FIG. 8, the user interface 800 outputs the word "loud" 802 as the printed word and a visual representation 806 of the word. In another example, the apparatus 200 outputs the word "loud" audibly. For example, the output module 214 outputs the word "loud" through a speaker of an information handling device 102. In some examples, the output module 214 outputs a word of the plurality of words for the user to practice and prompts the user to attempt the word to complete the stage of the game that the user is currently working on. For example, the output module 214 displays a word during the ingredients phase of the game shown in FIG. 7A. The output module 214 may also present phrases, sentences, reading passages, conversational prompts, and/or the like based on the selected complexity level.

Figure 3:
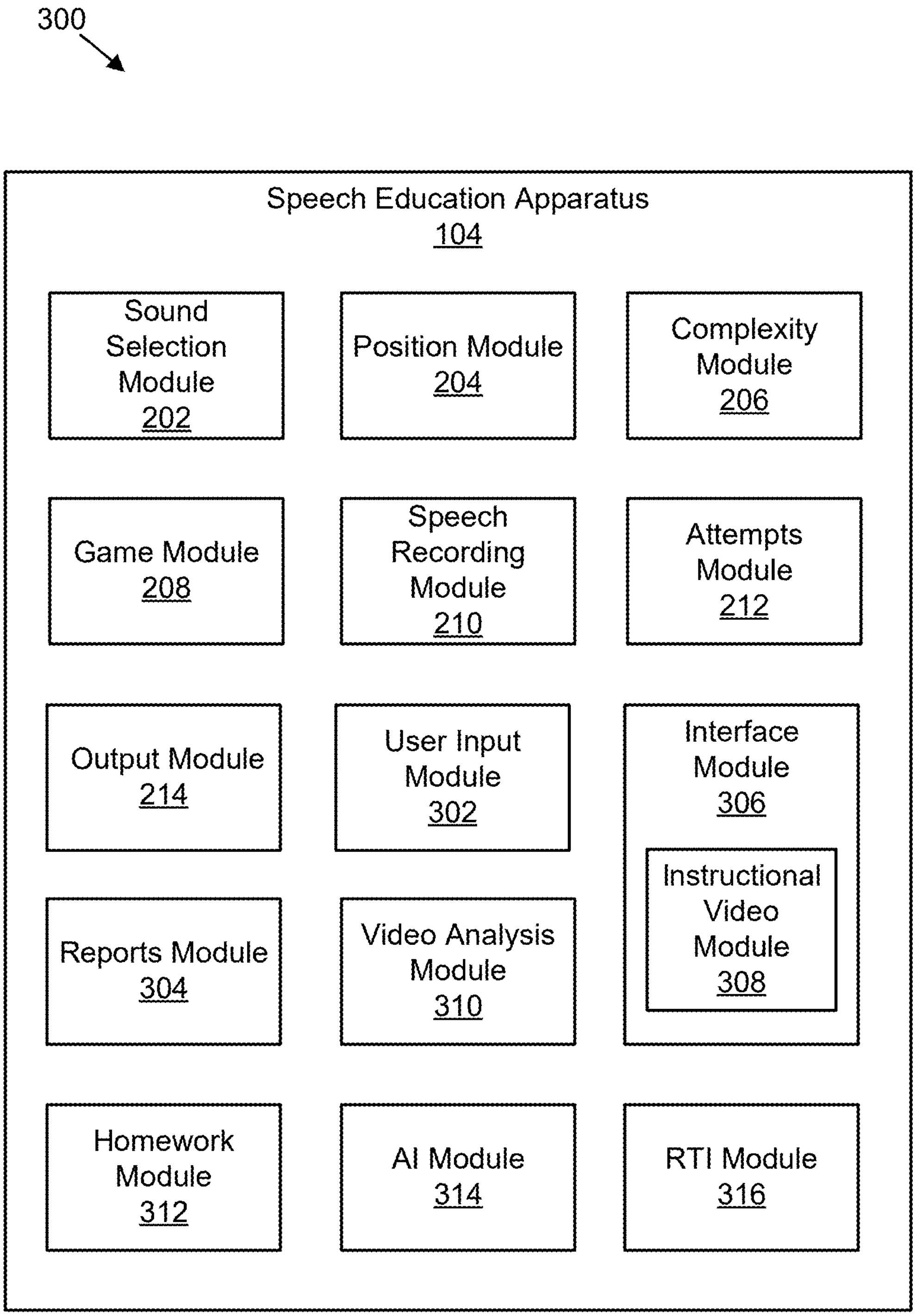
FIG. 3 is a schematic block diagram illustrating one example of another apparatus 300 for speech education.

FIG. 3 is a schematic block diagram illustrating one example of another apparatus 300 for speech education. In one example, the apparatus 300 includes an example of a speech education apparatus 104. The speech education apparatus 104, in some examples, includes one or more of a sound selection module 202, position module 204, word module 206, game module 208, output module 214, speech recording module 210, and attempts module 212, which may be examples of the modules described in connection with FIG. 2. In some examples, the apparatus 300 includes one or more of a user input module 302, a reports module 304, an interface module 306, an instructional video module 308, a video analysis module 310, and a homework module 312, which are described below.

In some examples, the user input module 302 is configured to receive input from at least one of a student user, a parent user, an SLP user, or the like. The input includes, for example, a sound selection, a sound position, a sound complexity level (e.g., whether to use words, phrases, sentences, reading passages, conversational prompts, or the like for the games), game selection, assigned quantity of attempts per word, or any combination thereof. In some examples, only certain accounts are capable of inputting information to design or configure the practice session. For example, a student user may be prohibited from modifying the practice session, whereas an SLP user may have full access to various game sessions.

In some examples, the reports module 304 is configured to notify a user when the student user has completed a game. For example, the reports module 304 transmits a notification to a parent user and/or an SLP user. In some examples, the notification includes a prompt for the user to transmit a message to another user. For example, the reports module 304 transmits a notification to the parent user that the student user has completed their practice session. The notification includes a button and/or a link for the parent user to transmit a message to the SLP user.

In some examples, the reports module 304 is configured to generate a report based at least in part on speech recorded by the speech recording module 210 throughout the practice session. The reports module 304 generates the report that includes, for example, the selected sound(s), selected sound position(s), results from an analysis of the recorded speech, the generated set(s) of words, the quantity of attempts, game(s) played, percentage of attempts that were successful, time spent practicing, percentage of assigned exercises completed, or any combination thereof.

For example, the reports module 304 is configured to compare the recording for each attempt of the number of attempts identified by the attempts module 212 to a reference audio for the sound/word being attempted. For example, for the word "thing", the reports module 304 compares the user's recording of the word "thing" to a reference recording. In some examples, the reports module 304 performs speech processing to give the user a score for that word and/or to determine if they pronounced the word correctly. In some examples, the report includes an indication of the percentage of the attempts that are successful.

Figure 10:
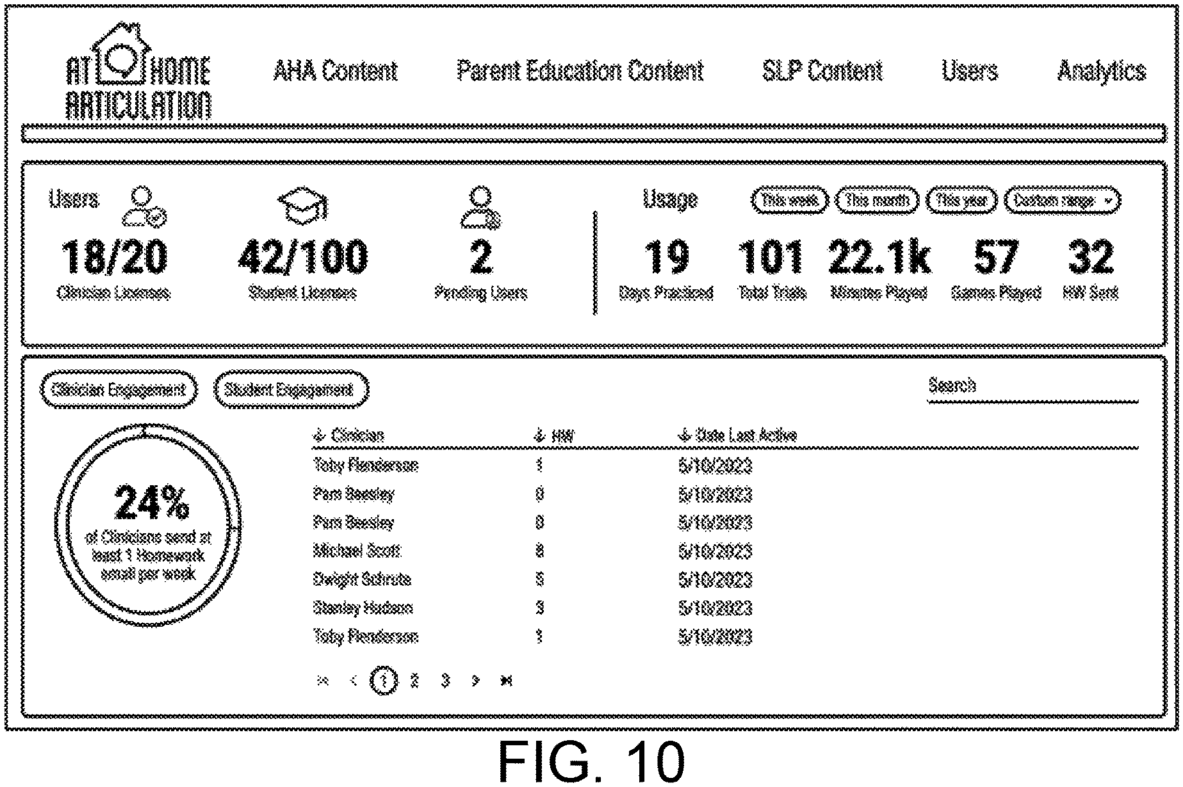
FIG. 10 illustrates an example of a reporting feature of a user interface.

The reports module 304 is configured to transmit the report to a user, such as the SLP user or the parent user. In some examples, the report includes an embedded audio or visual file and/or a link to a recording from the speech recording module. FIG. 10 depicts one embodiment of an interface that the reports module 304 generates showing the usage statistics, data, or the like for a clinician, for a student, or the like. For instance, the reports module 304 may track and display licensing information, practice information, homework information, engagement information, and/or the like, which may be filtered by time (e.g., by the past week, month, year, etc.).

In some examples, the interface module 306 is configured to present a GUI on a display of an information handling device 102. For example, the interface module 306 may be part of a mobile application that executes on a smart phone, tablet computer, or the like. The user interfaces 600, 700, 800, 900, and 1000 of FIGS. 6-10 present various examples of interfaces that the interface module 306 presents.

In some examples, the interface module 306 includes an instructional video module 308. The instructional video module 308 is configured to select, from a plurality of instructional videos, an instructional video corresponding to a sound that the sound selection module 202 selects. In one embodiment, the instructional video module 308 displays, within the GUI, the instructional video prior to displaying the first stage of the game. In some examples, the instructional video module 308 does not allow the student user to progress to the next stage of the game without viewing the video. In some examples, the instructional video includes multimedia content, e.g., videos, images, and/or audio, explaining proper pronunciation of the sound.

Figure 11:
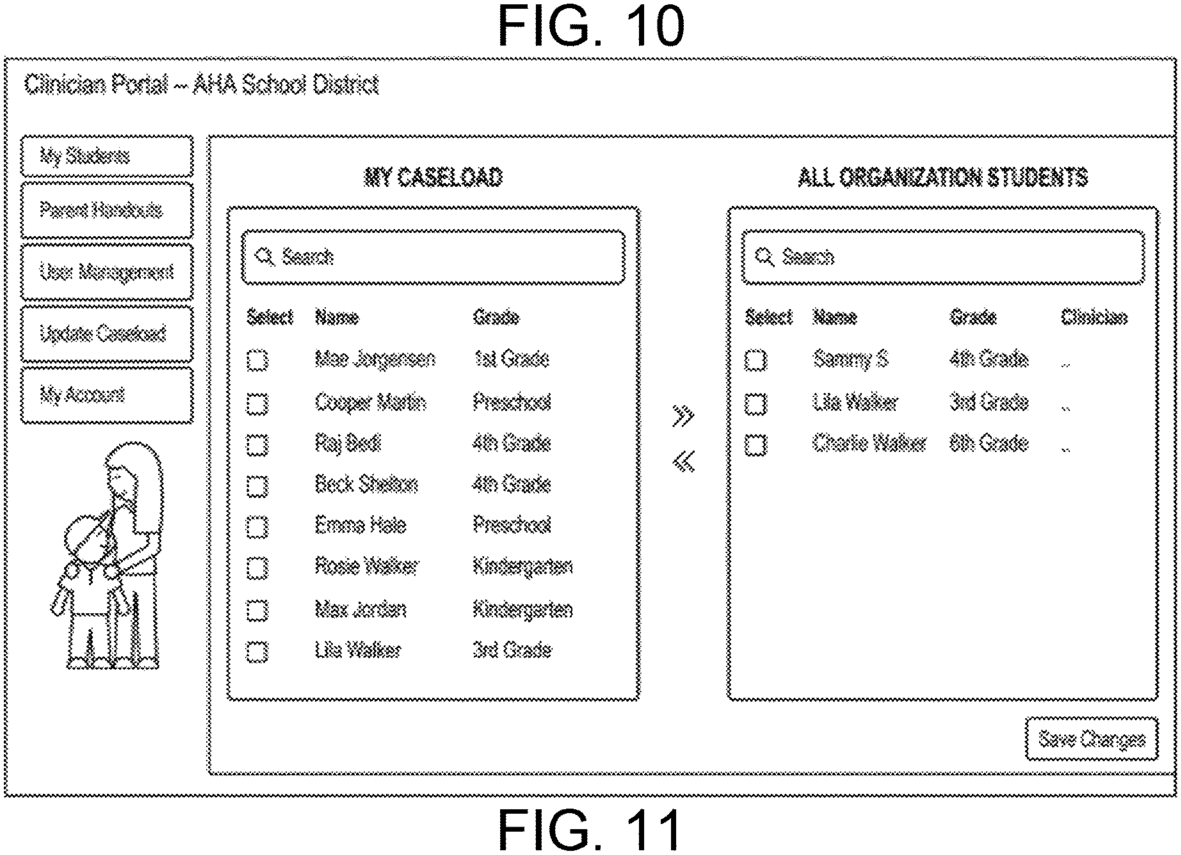
FIG. 11 illustrates an example interface for assigning students to clinicians.

In one embodiment, the interface module 306 presents interfaces for managing student/clinician assignments, such as the interface shown in FIG. 11. FIG. 11 presents an interactive interface where a clinician or administrator can use a drag and drop action, or interactive buttons, or the like, to assign and unassign students from a clinician's caseload.

In some examples, the speech recording module 210 is configured to capture a video of a user attempting a word (e.g., through a camera of a mobile device). In some examples, the video analysis module 310 is configured to determine an instruction based on the selected sound and a movement pattern of the student user's mouth and/or tongue shown in the video. The instruction includes a recommendation to change the movement pattern of the student user's mouth and/or tongue to improve pronunciation of the sound.

For example, the video analysis module 310 may determine that the student user pushes their tongue past their teeth when pronouncing the sound "l." In some examples, the video analysis module 310 makes this determination through AI analysis of the recorded video. The instruction includes a recommendation to keep their tongue behind their teeth when pronouncing that sound. In some examples, the reports module 304 transmits the instruction to the parent user. In some examples, the video analysis module 310 displays the instruction on the GUI.

In one embodiment, the remote learning module 312, in one embodiment, is configured to facilitate remote learning via a clinician portal, e.g., in an application, webpage, or program. The remote learning module 312, in one embodiment, may provide a clinician portal, as shown in FIGS.

9A-9C, that allows a clinician (e.g., an SLP) to interact with parents and students, create and send homework or other speech-related tasks to a user, e.g., a student or parent, and/or the like.

Figure 9A:
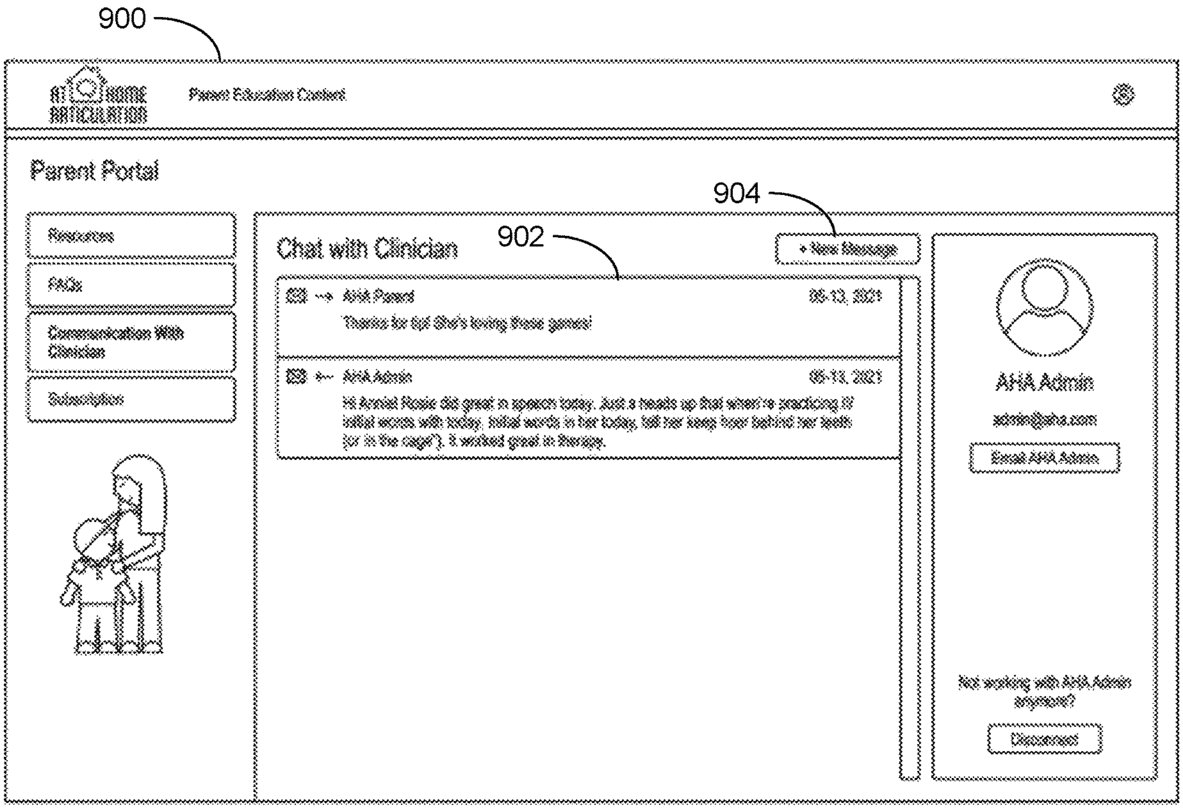
FIG. 9A illustrates an example messaging interface.

FIG. 9A shows one example of an interface 900 for facilitating communications between a clinician and a parent or student. In one embodiment, the interface 900 shows a chat or message history between a clinician and a parent, and provides an option 904 to create a new message. Other forms of communication may be provided such as email, text messaging, instant message, social messaging, or the like. The remote learning module 312 may provide a chat or other messaging feature to allow the student and/or parent to virtually interact with the SLP via text, video chat, audio chat, and/or the like. The remote learning module 312 may provide chat features such as push notifications, sending attachments, file sharing, and/or the like. The remote learning module 312 may also provide additional sources for remote learning such as guides, videos, FAQs, tips and tricks, links to online sources for speech learning, and/or the like.

Figure 9B:
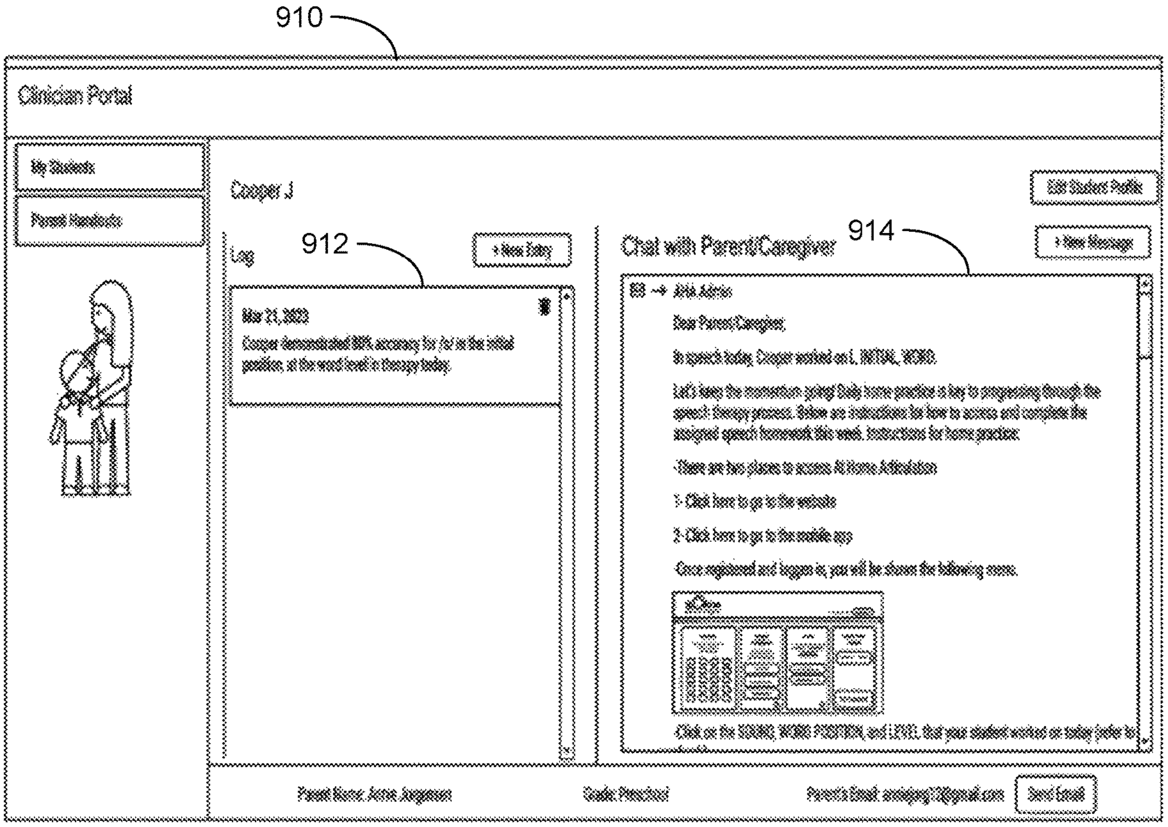
FIG. 9B illustrates an example activity log interface.

FIG. 9B shows one example of an interface 910 that presents an activity log 912 for the clinician, showing clinician notes from a lesson with a user. The interface 910 also allows the clinician to draft emails or other messages to the parent or student, with a summary of what the clinician and student worked on (which may be auto-filled from the activity log).

Figure 9C:
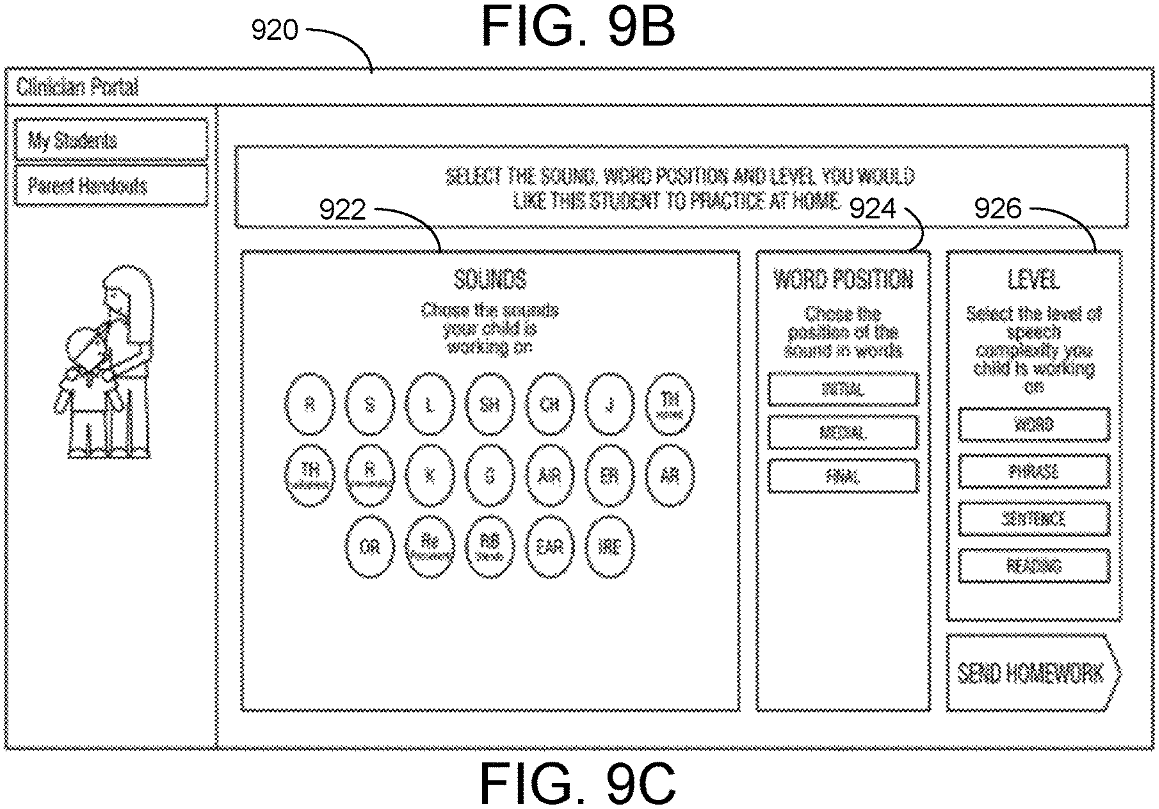
FIG. 9C illustrates an example homework creation interface.

FIG. 9C shows one example of an interface 910 that presents an interface that a clinician can use to generate speech homework, activities, lessons, or the like for a student. In such an embodiment, for example, a clinician may select the speech sound 922 that the student is working on, the position 924 of the speech sound in words, and the complexity level 926. The remote learning module 312 may generate homework lessons, learning or game suggestions or recommendations, or the like for continuing the speech learning at home or out of the presence of the SLP.

In one embodiment, the remote learning module 312 sends a message to the student and/or parent with the homework or links to the homework. For instance, the remote learning module 312 may generate a message that describes what the student worked on during their speech lesson with an SLP and links to speech homework or games, directions to setting up homework lessons, and/or the like, to emphasize and reinforce the speech lessons that the student has been working on.

In one embodiment, the AI module 314 is configured to implement various machine learning models to analyze data associated with a speech learning program. As used herein, AI refers to technology, algorithms, models, or the like that enables computers and machines to simulate human learning, comprehension, problem solving, decision making, creativity and autonomy.

As used herein, artificial intelligence engines, machine learning models, or the like may be trained to analyze different data as it relates to speech learning. For instance, AI may be integrated to perform various functions such as provide immediate feedback on student's responses and provide instruction for improvement, seamlessly and reliably score the accuracy of students' responses (~50/session), upload accuracy data in real time for clinicians to review on the dashboard, offer clinicians more reliable data to inform decision-making, guide students and parents toward interactive instructional videos and "tips & tricks" that, based on accuracy data, are most relevant to the student's areas of struggle, allow data to be viewed at the individual student level (for the clinical and parents) and in aggregate (to benefit practitioner, research, and development communities), and provide clinicians with informal assessment baseline measures.

In one embodiment, the AI module 314 may train AI engines or machine learning models on large datasets of speech to recognize deviations from typical pronunciation patterns. For example, the AI module 314 may use AI engines to analyze phonetic accuracy, identifying mispronounced sounds (like saying "wabbit" for "rabbit"); detect articulation errors (substitutions, omissions, distortions, or the like); and/or identify phonological processes, such as simplifying consonant clusters ("poon" for "spoon").

In one embodiment, the AI module 314 uses trained engines or models to provide personalized feedback and therapy suggestions. For instance, when errors are detected, the AI module 314 can provide tailored exercises to address specific speech sound errors such as interactive correlation tools that provide real-time feedback on whether a student pronounces a sound correctly. In another embodiment, the AI module 314 can provide speech exercises, activities, and games that are designed to help students practice sounds that they're struggling with. In one embodiment, the AI module 314 also provides progress tracking to monitor improvements and adapting exercises accordingly.

In one embodiment, the AI module 314 uses trained engines or models to provide assessments such as real-time speech analysis and error detection. For instance, the AI module 314 may analyze a student's speech in real-time to detect common articulation errors like substitutions, omissions, distortions, and additions. In such an embodiment, the AI module 314 may automatically transcribe the speech and compare it against target pronunciations. In one embodiment, the AI module 314 identifies phonemes that are consistently misarticulated (e.g., /r/ for /w/, as in "wabbit" instead of "rabbit"). In certain embodiments, the AI module 314 can classify errors based on predefined phonological processes (e.g., identifying patterns of fronting, backing, stopping).

In one embodiment, the AI module 314 uses trained engines or models to collect sample speech and automates reporting. For instance, the AI module 314 may collect and analyze speech samples during informal interactions and records and log samples over time, giving SLPs a way to revisit previous sessions and track progress; provide automated reports that highlight areas of concern, such as which sounds or sound clusters are problematic; and/or offer objective measures such as speech accuracy percentage, sound error patterns, and consistency of errors across different contexts (single words, phrases, conversation).

In one embodiment, the AI module 314 uses trained engines or models to help tailor or personalize articulation therapy by breaking down speech into its constituent phonemes and offering insights into where breakdowns occur. During informal assessments, the AI module 314 could, for example, identify specific sounds or sound combinations that are challenging for the child, suggest which articulation targets the child is ready to work on next based on their performance, provide instant feedback during practice, showing the child whether they pronounced the sound correctly, thereby helping SLPs quickly identify target areas, or the like.

In one embodiment, the AI module 314 uses trained engines or models to analyze large amounts of data from multiple speech sessions to identify trends and patterns that might not be immediately obvious to an SLP during informal assessments. In such an embodiment, this analysis may help pinpoint patterns of improvement or persistent errors, generate personalized intervention plans that adjust based on the child's progress, and recommend specific activities or homework that can reinforce correct articulation based on identified needs.

In one embodiment, the AI module 314 may embed trained engines or models within interactive speech games, activities, or applications that are used for informal assessments. The games, together with the AI module 314, may provide gamified assessments, where AI tracks the student's progress while they engage in speech tasks or games. In another embodiment, the AI module 314 may use natural language processing (NLP) to recognize speech and give real-time correction or praise, making the assessment less stressful for the student. In one embodiment, the AI module 314 may adjust difficulty levels automatically based on how the student performs, helping the SLP quickly evaluate strengths and weaknesses in articulation.

In one embodiment, the AI module 314 uses trained engines or models to help detect articulation errors in multiple languages or dialects by being trained on various phonetic systems, for students who are bilingual or speak in different dialects. In such an embodiment, this may allow the AU module 314 and/or SLPs to assess articulation in a child's first language or second language, compare error patterns across languages to see if the issue is language-specific or global, and/or create custom articulation exercises for non-native speakers that fit their specific language needs.

In one embodiment, with the advent of teletherapy, AI-driven tools for informal assessment can be used in remote settings where SLPs may not be able to observe children in person. In such an embodiment, the AI module 314 may record and analyze speech remotely, allowing SLPs to access assessment data and make recommendations without being physically present; provide at-home speech practice with feedback, ensuring continuity of care between therapy sessions; and/or share speech data securely with SLPs, allowing them to continue informal assessments even in virtual environments.

In one embodiment, the RTI module 316 is configured to provide tools, features, functions, or the like for response to intervention (RTI), which is a multi-tiered system of support (MTSS), e.g., that schools put in place before a student can qualify for special education services.

In one embodiment, tier 1 involves supporting all students, such as when teachers offer whole-class phonetic sound guidance. Tier 2 involves 1:1 or small-group in-class interventions. Typically, a clinician administers a screener to students suspected of needing additional speech/language support. The clinician provides teachers with worksheets for those students to complete during class. Teachers facilitate students' completion of assignments, provide as-needed guidance, and collect data to measure progress. Tier 3 occurs if a student does not make sufficient progress with a Tier 2 intervention. Clinicians conduct a more in-depth assessment (e.g., Goldman Fristoe Test of Articulation), to determine special education eligibility. An individualized education program (IEP) with specialized instruction and services are developed for those who qualify. Tier 4 involves carrying out the IEP and monitoring progress. The RTI module 316 may provide information, tools, resources, or the like for completing or assessing each tier.

For instance, the RTI module 316 may guide the use of appropriate interventions for students experiencing speech/language challenges, based on research that many students can avoid special education services if they receive lowerlift, high-quality interventions. A persistent challenge, however, is that RTI's success relies heavily on classroom teachers, who lack speech therapy training and have limited time. Similarly, overworked clinicians lack the bandwidth to communicate with teachers or offer guidance for supporting each student.

The RTI module 316 provides resources to bridge the gap between the classroom and school therapy room, allow more students with speech and articulation challenges to remain in general education classrooms, and reserve special education resources for students who truly need them.

In one embodiment, the RTI module 316 provides an RTI portal allowing clinicians to upload a caseload of teachers implementing classroom-based interventions, short instructional videos and Tips & Tricks to help teachers assess a student's accuracy with regard to particular sounds, words, and word positioning, a tool allowing the clinician to email the teacher with gamified classroom practice assignments tailored for each student, along with relevant videos and Tips & Tricks, a Teacher companion app for use during practice sessions, so teachers can document and upload data about the accuracy of students' responses in real time, a feature that records students reading a list of words that demonstrate focal sounds for clinicians to use as a supplemental measure of progress and/or to confirm accuracy of teacher ratings, or the like.

Figure 4:
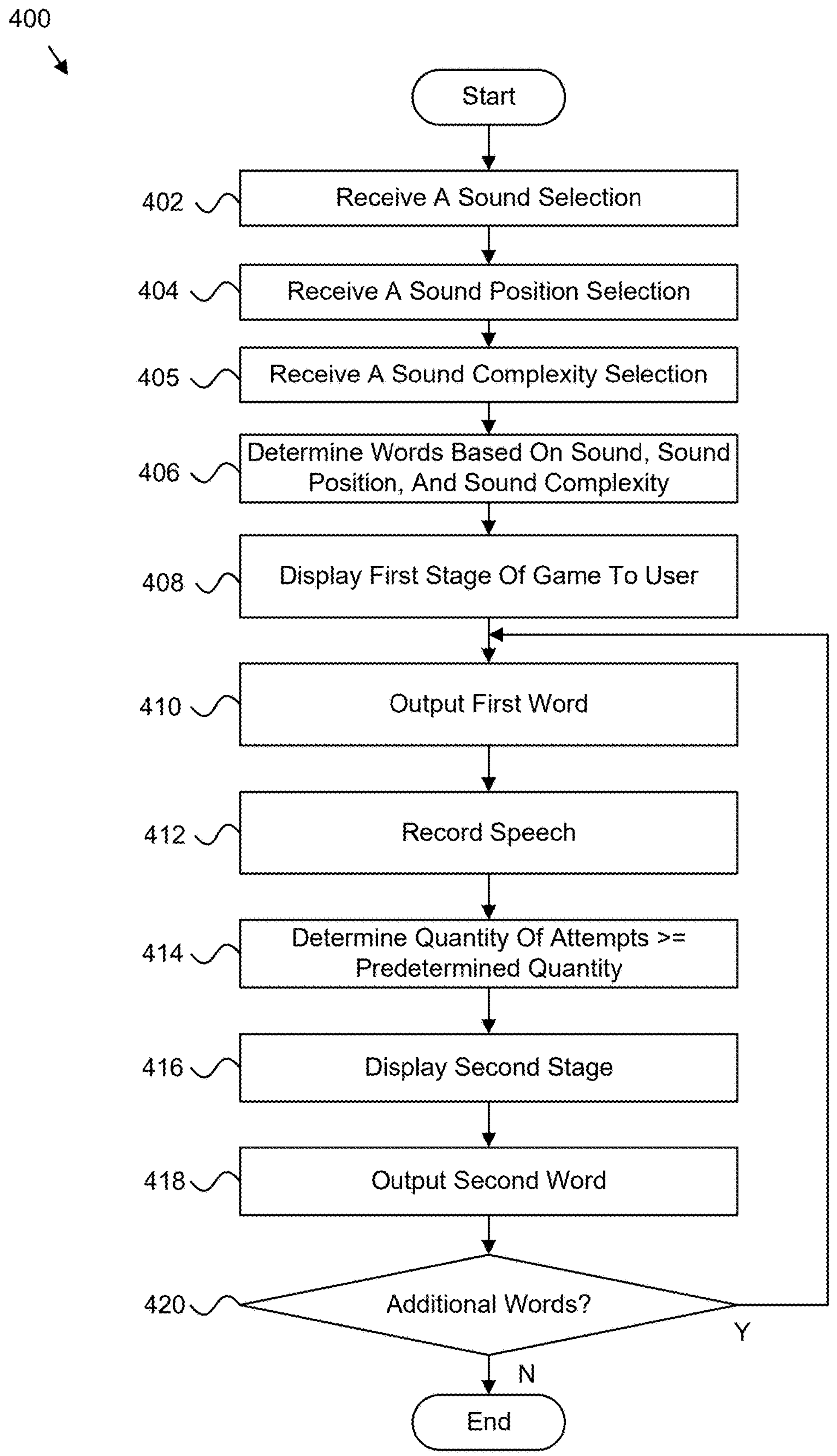
FIG. 4 is a schematic flow chart diagram illustrating one example of a method for speech education.

FIG. 4 is a schematic flow chart diagram illustrating one example of a method 400 for speech education. In one embodiment, at least a portion of the method 400 is performed by a speech education apparatus 104, an information handling device 102, a server 108, and/or the like.

In one embodiment, the method 400 begins and receives 402 a selection of a sound of a plurality of sounds. In one embodiment, the method 400 receives 404 a selection of a sound position of a plurality of sound positions. In one embodiment, the method 400 receives a selection of a sound complexity of a plurality of sound complexities. In one embodiment, the method 400 determines 406 a plurality of words based at least in part on the sound and the sound position.

In one embodiment, the method 400 displays 408 a first stage of a game to a user. In one embodiment, the method 400 outputs 410 a first word of the plurality of words. In one embodiment, the method 400 records 412 speech from the user. In one embodiment, the method 400 determines 414 based on the recorded speech, that the user has made a quantity of attempts to speak the first word.

In one embodiment, the method 400 determines that the quantity of attempts is equal to or greater than a predetermined quantity. In response to that determination, the method 400 displays 416 a second stage of the game to the user. In one embodiment, the method 400 outputs 418 a second word of the plurality of words, and the method 400 ends. In one embodiment, the method determines 420 if there are additional words. If not, the method 400 ends; otherwise, the method 400 repeats steps 410-418 for each word of the plurality of generated words.

Figure 5:
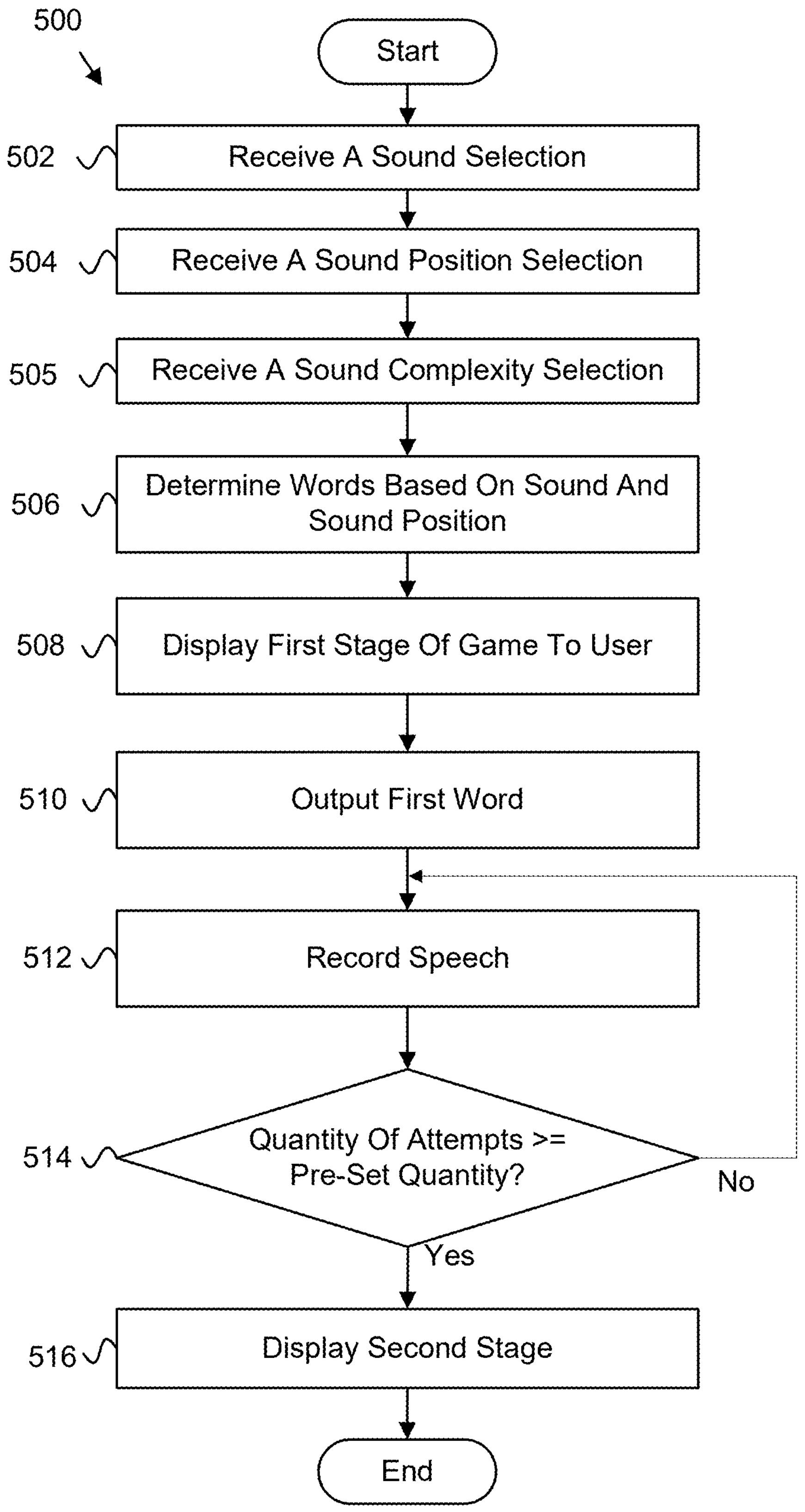
FIG. 5 is a schematic flow chart diagram illustrating one example of another method for speech education.

FIG. 5 is a schematic flow chart diagram illustrating one example of another method 500 for speech education. The method 500 includes steps similar to steps 402-416 of method 400. However, in response to determining that the quantity of attempts is not greater than or equal to the assigned quantity at step 514, the method 500 returns to step 512 of recording speech until the assigned quantity has been reached before moving to the second stage 516.

Examples may be practiced in other specific forms. The described examples are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus, comprising:
a processor;
a memory that stores code executable by the processor to:
receive a selection of a sound of a plurality of sounds;
receive a selection of a sound position of a plurality of sound positions;
receive a selection of a sound complexity;
determine a plurality of words based at least in part on the selected sound, the selected sound position, and the selected sound complexity;
display a first stage of a game to a user;
output a first word of the plurality of words within the game;
determine that the user has made a quantity of attempts to speak the first word;
determine that the quantity of attempts satisfies a predetermined quantity; and
in response to the determination, display a second stage of the game and a second word of the plurality of words.

2. The apparatus of claim 1, wherein the plurality of words comprise words having the sound in the sound position.

3. The apparatus of claim 1, wherein the code is executable by the processor to, in response to input from the user, generate a number of phrases, each phrase comprising at least one word of the plurality of words.

4. The apparatus of claim 1, wherein the code is executable by the processor to, in response to input from the user, generate a number of sentences, each sentence comprising at least one word of the plurality of words.

5. The apparatus of claim 1, wherein the sound position comprises at least one of: a first syllable of a word, a middle syllable of a word, or an ending syllable of a word.

6. The apparatus of claim 1, wherein the code is executable by the processor to select the sound and the sound position based at least in part on input from the user, input from an additional user, or a combination thereof.

7. The apparatus of claim 1, wherein the code is executable by the processor to:
record additional speech from the user;
determine, based on additional recorded speech, that the user has made an additional quantity of attempts to speak the second word;
determine that the additional quantity of attempts is equal to or greater than the predetermined quantity;
in response to the determination, display a third stage of the game to the user; and
output a third word of the plurality of words.

8. The apparatus of claim 1, wherein the code is executable by the processor to:
select a second sound of a plurality of sounds;
select an additional sound position of the plurality of sound positions; and
determine, based at least in part on the additional sound and the additional sound position, an additional plurality of words.

9. The apparatus of claim 1, wherein the code is executable by the processor to:
in response to determining that the user has completed each stage of a plurality of stages of the game, transmit a notification to a second user, wherein the notification prompts the second user to transmit a message to a third user.

10. The apparatus of claim 9, wherein the code is executable by the processor to select at least one of the sound or the sound position based at least in part on input from the third user.

11. The apparatus of claim 1, further comprising a mobile application on a mobile device, the mobile application having a graphical user interface ("GUI"), wherein the code is further executable by the processor to display the first stage of the game to the user and the second stage of the game to the user through the GUI.

12. The apparatus of claim 11, wherein the code is further executable by the processor to output the first word and the second word via at least one of the GUI and a speaker of the mobile device.

13. The apparatus of claim 11, wherein the code is executable to:
select, from a plurality of instructional videos, an instructional video corresponding to the selected sound; and
display, within the GUI, the instructional video prior to displaying the first stage of the game.

14. The apparatus of claim 1, wherein the code is further executable by the processor to:
generate a report based at least in part on recorded speech, the selected sound, the selected sound position, the plurality of words, the quantity of attempts, at least one game which the user progresses through in one session; and
transmit the report to a second user.

15. The apparatus of claim 14, wherein the code is further executable by the processor to transmit a recording of the recorded speech to at least one of the second user and a third user.

16. A method, comprising:
receiving a selection of a sound of a plurality of sounds;
receiving a selection of a sound position of a plurality of sound positions;
receiving a selection of a sound complexity;
determining a plurality of words based at least in part on the selected sound, the selected sound position, and the selected sound complexity;
displaying a first stage of a game to a user;
outputting a first word of the plurality of words within the game;
determining that the user has made a quantity of attempts to speak the first word;
determining that the quantity of attempts satisfies a predetermined quantity; and
in response to the determination, displaying a second stage of the game and a second word of the plurality of words.

17. A computer program product, comprising a non-transitory computer readable storage medium that stores code executable by a processor, the executable code comprising code to perform:
receiving a selection of a sound of a plurality of sounds;
receiving a selection of a sound position of a plurality of sound positions;
receiving a selection of a sound complexity;
determining a plurality of words based at least in part on the sound, the sound position, and the sound complexity;
generating a display, the display comprising:

one or more sentences comprising each word of the plurality of words; and a plurality of images, the plurality of images positioned on the display in an order corresponding to an order of the plurality of words, wherein each image of the plurality of images comprises at least one image corresponding to a word of the plurality of words for facilitating speech learning.

18. The computer program product of claim 17, wherein the executable code further comprises code to perform:

identifying a number of attempts within recorded speech, each attempt of the number of attempts comprising an attempt of a user to speak a word of the plurality of words; and comparing each attempt of the number of attempts to a reference audio sound for the word;

determining, based at least in part on the comparing, whether each attempt of the number of attempts comprises a successful attempt or an unsuccessful attempt; and transmitting a notification to an additional user, the notification comprising a percentage of successful attempts of the number of attempts.

19. The computer program product of claim 18, wherein the executable code further comprises code to perform determining whether a quantity of the number of successful attempts is less than a threshold quantity.

20. The computer program product of claim 19, wherein the executable code further comprises code to perform:

capturing a video of the user performing the recorded speech;

determining, based on the selected sound and a movement pattern of the user's mouth and/or tongue, an instruction; and transmitting the instruction to at least one of the user and an additional user, wherein the instruction comprises an instruction to change a movement pattern of the user's mouth and/or tongue to improve pronunciation of the selected sound.

* * * * *